United States Patent [19]

Matsushita

[11] 4,007,643
[45] Feb. 15, 1977

[54] VIBRATION SENSING AND RESPONDING DEVICE

[76] Inventor: Yukio Matsushita, 202-5 Tsuchiyama, Hiraoka, Kakogawa, Hyogo, Japan

[22] Filed: June 6, 1975

[21] Appl. No.: 584,628

[30] Foreign Application Priority Data

Dec. 9, 1974  Japan ............................ 49-141828
Dec. 9, 1974  Japan ............................ 49-141829

[52] U.S. Cl. ........................................ 74/2; 137/38
[51] Int. Cl.² ........................................ G05G 17/00
[58] Field of Search ....... 74/2; 200/61.45 R, 61.52; 137/38, 45

[56] References Cited

UNITED STATES PATENTS

| | | | |
|---|---|---|---|
| 2,017,274 | 10/1935 | Breitenstein | 200/61.52 |
| 2,056,494 | 10/1936 | Tucker, Jr. et al. | 200/61.45 R |
| 3,644,921 | 2/1972 | Duggan et al. | 200/61.45 R X |
| 3,768,497 | 10/1973 | Mueller | 137/38 |
| 3,805,818 | 4/1974 | Yamada | 137/38 |
| 3,878,858 | 4/1975 | Yamada | 137/38 |

*Primary Examiner*—Allan D. Herrmann
*Attorney, Agent, or Firm*—Eugene E. Geoffrey, Jr.

[57] ABSTRACT

Vibration sensing and responding apparatus which includes a concave spherical surface and a ball disposed on said surface. Spring loaded means extends through said surface and is retained in position by said ball. Should the ball be displaced by horizontal vibration of the surface or be displaced by a mechanism responding to vertical vibration, the spring loaded means will move upwardly and in so doing actuate a device coupled thereto.

2 Claims, 6 Drawing Figures

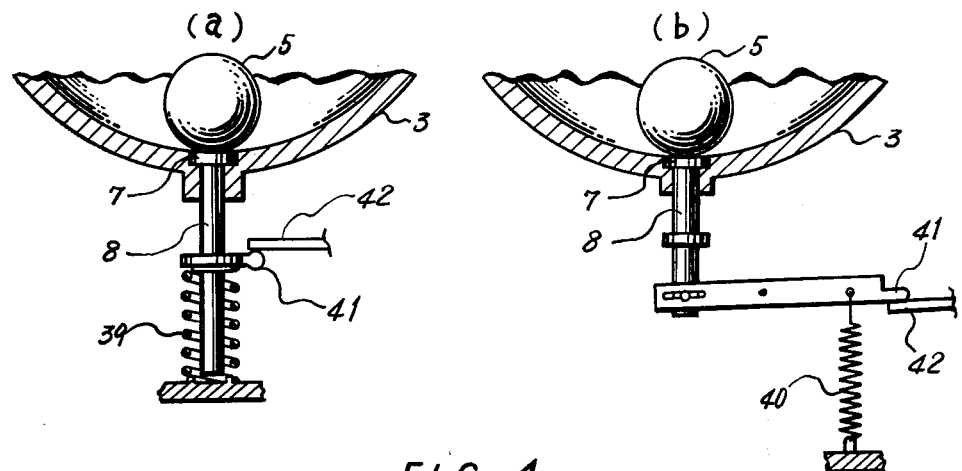
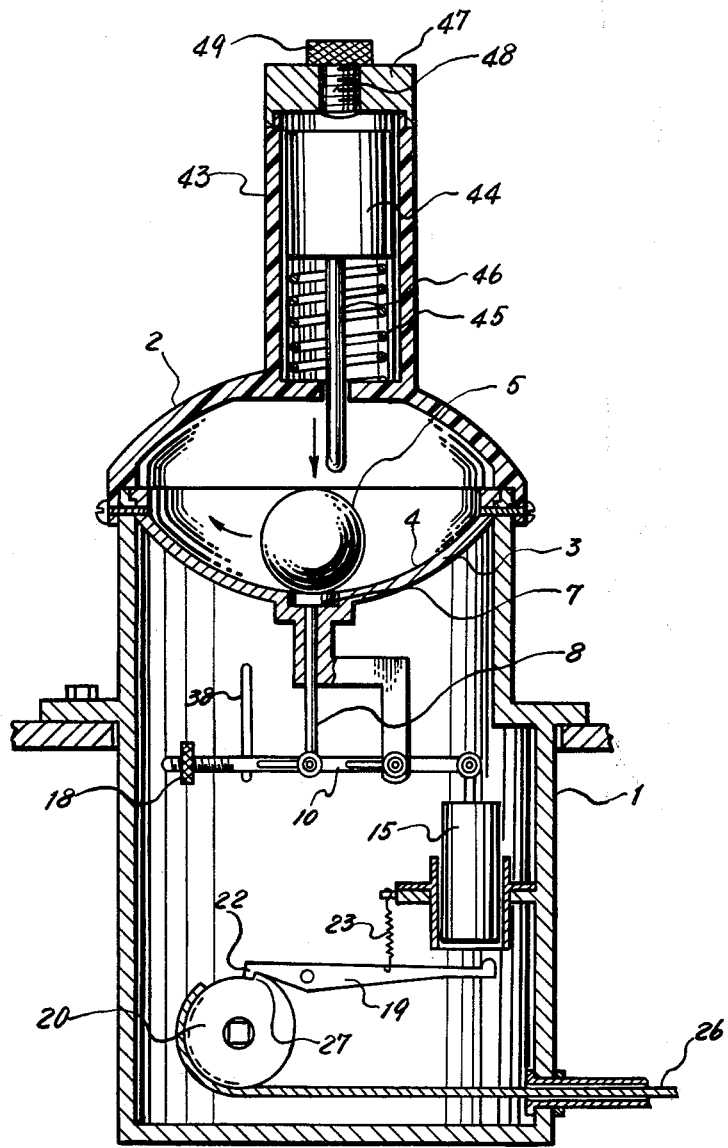
FIG. 4
FIG. 5

VIBRATION SENSING AND RESPONDING DEVICE

This invention relates to a vibration sensing and responding device, and especially to a device for sensing vibrations due to earthquakes and the like and quickly respond thereto to actuate other utilization devices in purely mechanical fashion.

In order to minimize a danger of outbreak of fire in the case of an earthquake for example, it is preferable to quickly shut off feed lines for fuel gases. For this purpose, a device is needed for sensing such vibrations and quickly close the main valve of the feed lines. Although some devices of this kind have been proposed, such prior devices have been more or less electrical, that is, they have included some electric components. Accordingly, there has been an unavoidable danger of fire from sparks produced by electric contacts.

Accordingly an object of this invention is to provide a device which does not include electric components and can sense a vibration exceeding a predetermined magnitude and respond quickly thereto to actuate other utilization devices, such as gas shutoff valves, in a purely mechanical fashion, thereby completely removing the above mentioned danger.

According to a feature of this invention, the device comprises a spherical ball, a ball saucer having a spherical inner surface for sustaining said ball, the radius of curvature of said inner surface being sufficiently greater than the radius of said ball, a depression formed in the bottom of said inner surface, a reciprocable member substantially disposed within said depression and placed just under said ball in the normal stationary condition, means for urging said member upwardly with such a force that it can not move against the weight of said ball in the normal stationary condition but can move upwardly to protrude from the inner surface of said ball saucer when said ball leaves said member, and means coupling said member to said utilization device for actuating said utilization device in response to the motion of said member.

According to another feature of this invention, the device further comprises a weight suspended by a spring for vertical motion and a ball displacing mechanism coupled to said weight for displacing said ball in response to the vertical vibration of said weight.

These and other objects and features of this invention will be described in more detail hereinunder with reference to the accompanying drawings.

Figures 1, 2:
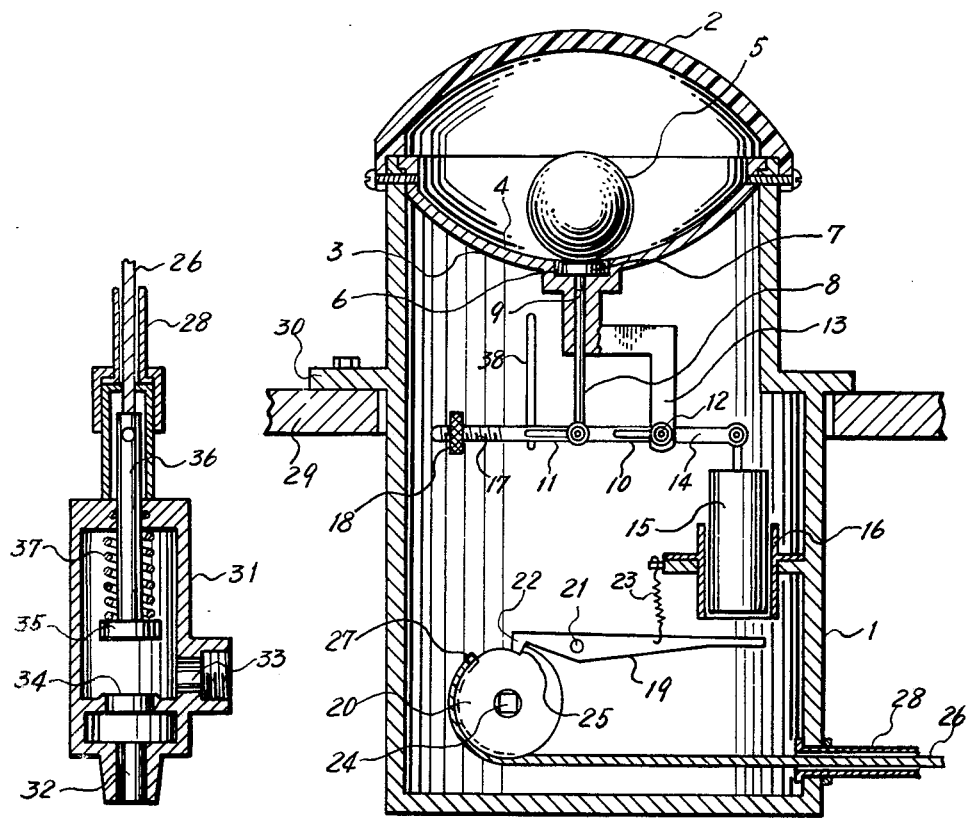
FIG. 1 is a cross sectional side view representing one embodiment of the device of this invention in the normal stationary condition.
FIG. 2 is a cross sectional side view representing an example of gas shutoff valve suitable for use in connection with the device of FIG. 1.

FIGS. 4(a) and 4(b) are cross sectional side views representing two modified forms of the spring loaded reciprocating means in the device of FIG. 1; and FIG. 5 is a sectional side view representing another embodiment of the device of this invention.

Throughout the drawings, like reference numerals are used to denote like structural components.

Referring first to FIG. 1, the device comprises a substantially circular housing 1 having a domed cover 2 made of transparent plastic material and a ball saucer 3 located at the top of the housing 1 and just under the cover 2. The ball saucer 3 has a spherical inner surface 4 and sustains a spherical ball 5 made of a material having a relatively large specific gravity, such as steel. The radius of curvature of the spherical inner surface 4 of the ball saucer 3 is sufficiently greater than the radius of the ball 5 so that the ball can roll over the inner surface 4 relatively easily and come to rest in the central portion of the inner surface in the stationary condition. The diameter of the ball saucer 3 is also selected large enough as compared with the diameter of the ball 5 so that the ball 5 can roll away sufficiently far from the central portion of the inner surface 4.

The central bottom of the inner surface 4 of the ball saucer 3, includes a circular depression 6 in which a disc member 7 is disposed such that its upper face substantially conforms to the inner surface 4. In the stationary condition, the ball 5 rests on the disc member 7. From the bottom of the disc member 7, a vertical reciprocable rod 8 extends downwardly through a guide hole 9 of the saucer 3, which permits vertical motion of the rod 8. The disc member 7 and vertical rod 8, which may be made integrally, constitute the reciprocable member of this invention. While the upper face of the disc member 7 may be flat, it is preferably curved in order to maintain a proper stability of the ball 5 thereon.

The lower end of the vertical rod 8 is pivotally coupled to one arm 11 of a lever 10 which is supported by a pivot 12 on a bracket 13 extending from the ball saucer 3. Depending from the other arm 14 of the lever 10, is a cylindrical weight 15 which is slidably inserted in a cylindrical guide 16 fixed to the housing 1. The end portion 17 of the lever arm 11 is threaded and an adjusting weight 18 is screwed thereon. The lever 10 and weights 15 and 18, which constitute the urging means of this invention, are arranged and adjusted such that the reciprocable member consisting of the disc member 7 and rod 8 can not move upwardly against the weight of the ball 5 in the stationary condition but can move upwardly when the ball 5 moves away from the disc member 7 as shown in FIG. 2.

In this embodiment, the coupling means between the reciprocable member and the utilization device is composed of a disengaging mechanism comprising a pawl lever 19 and a pawl wheel 20. The pawl lever 19 is supported at a pivot 21 and has a pawl 22 at one end. The other end of the lever 19 is located just under the weight 15 and is urged upwardly by a spring 23. The pawl wheel 20 is fixed to a shaft 24 which can be rotated from the outside of the housing 1, and has a peripheral pawl 25 arranged to engage with the pawl 22 of the pawl lever 19 as shown in the drawing. The disengaging mechanism is provided with a connection cord 26 one end of which is wound halfway on the pawl wheel 20 and fixed at a peripheral point 27 and the other end of which is drawn out of the housing 1 through a guide tube 28 to a utilization device to be actuated.

The housing 1 itself is fixed to an appropriate base 29 by a flange 30 so that the ball 5 is settled in the center of the disc member 7.

The preferred embodiment of gas shutoff valve, as shown in FIG. 2, is composed of a casing 31 having an inlet port 32 and an outlet port 33 which are to be connected to gas piping. In the casing 31, there are a valve seat 34 and a valve body 35 facing the valve seat.

The valve body 35 is connected through a plunger 36 to the connection cord 26 which is led from the disengaging mechanism of the device of FIG. 1 through the guide tube 28, and is always urged toward the valve seat 34 by a compression spring 37. The relative location of the device of FIG. 1 and the shutoff valve of FIG. 2 and the length of the cord 26 are previously selected such that, in the normal stationary condition as shown in FIG. 1, the cord 26 is forcibly stretched to pull the valve body 35 away from the valve seat 34 against the spring 37 as shown in FIG. 2.

Figure 3:
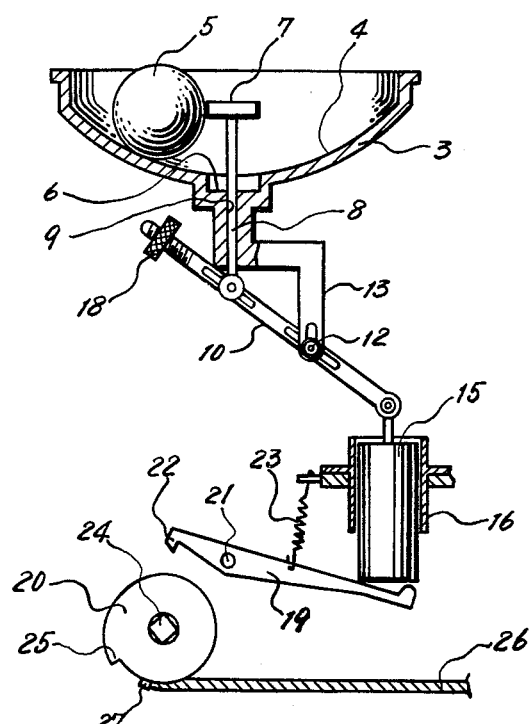
FIG. 3 is a cross sectional side view representing the essential components of the device of FIG. 1 to illustrate the operation of the device in an emergency.

Now the system operation will be described with reference to FIGS. 1 and 2 and especially to FIG. 3. When the device of FIG. 1 is horizontally vibrated by an earthquake or the like, the ball 5 which tends to conserve its original stationary condition by its inertial force is displaced relatively with respect to the original position on the disc member 7 and begins to roll on the inner surface 4 of the ball saucer 3. When the amplitude of vibration exceeds a specific value, the ball 3 rolls away from the disc member 7. At this time, the reciprocable member including the disc member 7 and the vertical rod 8, which are urged upwards by the weight 15, jumps up as shown in FIG. 3 and the weight 15 falls down in the guide cylinder 16 onto the end of the pawl lever 19. The pawl lever 19 is thereby rotated about the pivot 21 and the pawl 22 is disengaged from the peripheral pawl 25 of the pawl wheel 20. The pawl wheel 20 is then permitted to rotate under the tension of the connection cord 26 provided by the compression spring 37 of the shutoff valve (FIG. 2). Consequently, the valve body 35 of the shutoff valve is pressed against the valve seat 34 by the spring 37 to close the valve. As the ball 5 is blocked by the reciprocable member, the system remains in the actuated condition until it is restored manually. Restoration of the system can be effected by pushing down the lever end 11 with a screw driver, for example, inserted through a slot 38 formed in the wall of the housing 1 to return the ball 5 onto the disc member 7 and then rotating the pawl wheel 20 backwardly from the outside until the pawl 22 engages with the peripheral pawl 25.

While, in the embodiment of FIG. 1, the urging means is composed of the lever 10 and weight 15, it is of course evident that other mechanisms may be used for urging the reciprocable member. For example, in the embodiments of FIGS. 4(a) and 4(b), a compression spring 39 and a tension spring 40 are adopted respectively for urging the vertical rod 8 upwardly. In either case, a driving member 41 of the urging means drives a driven member 42 of the disengaging mechanism, which corresponds to the pawl lever 19 of FIG. 1, for example. The mechanisms of FIGS. 4(a) and 4(b) are self-explanatory and need no more description. It is also obvious that various modifications and changes of the urging means and the disengaging mechanism may be made without departing from the scope of this invention.

The embodiment of FIG. 5 is completely the same in structure as the embodiment of FIG. 1, except for the domed cover 2. In this embodiment, the domed plastic cover 2 is provided integrally with a vertical cylindrical casing 43 in which a cylindrical weight 44 made of a material having a relatively large specific gravity, such as steel, is suspended by a compression spring 45. From the bottom of the weight 44, a rod 46 is positioned just above the ball 5 and a little offset from the vertical axis of the ball in the normal stationary condition. The casing 43 is provided with a cap 47 having a test hole 48 with a screw plug 49.

If the device encounters a vertical vibration, the suspension weight 44 vibrates vertically with respect to the device due to its inertia. This results in a vertical movement of the rod 46 and, when the amplitude of vibration exceeds a certain specific value, the lower end of the rod 46 collides with the ball 5. As the lower end of the rod 46 is a little offset from the vertical axis of the ball 5, the ball is kicked horizontally to roll over the inner surface 4 of the ball saucer 3 and, when the vertical vibration increases to some extent, the ball leaves the disc member 7 to cause vertical displacement of the reciprocable member. The same actions as described in conjunction with the embodiment of FIG. 1 follow and the shutoff valve is therefore closed by vertical vibration.

As described above, the embodiment of FIG. 5 can sense not only horizontal vibration but also vertical vibration, while the embodiment of FIG. 1 can sense horizontal vibration only. In case of a device to afford protection against earthquakes, however, the embodiment of FIG. 1 is generally enough for attaining the object because most of the earthquakes involves horizontal vibration.

It is expected that the geometrical and mechanical features and positional relationship of some essential components of the device must be critically selected in order to obtain effective and sensitive operation of the device. In the embodiment of FIG. 5, for instance, it has been found that the effective diameter and radius of curvature of the ball saucer 3, the diameter and weight of the ball 5, the geometry of the disc member 7, the weight of the suspension weight 44, the elasticity of the suspension spring 45 and the position of the lower end of the rod 46 with respect to the ball 5 are important. As a result of energetic experiments, the inventor has decided the values of these parameters which are recommended for effectively sensing and responding to an earthquake having horizontal seismic intensity of about 3500 gals and vertical amplitude of 34 to 36 milimeters, as follows.

| | | |
|---|---|---|
| Ball saucer 3: | | |
|   Effective diameter | 60 | mms. |
|   Radius of curvature | 36.5 | mms. |
| Spherical ball 5: | | |
|   Diameter | 18 | mms. |
|   Weight | 45 | grams |
| Disc member 7: | | |
|   Diameter | 5 | mms. |
|   Radius of curvature of the upper face | 10 | mms. |
| Suspension weight 44: | 85 | grams |
| Modulus of elasticity of Spring 45: | 47 | gms./cm. (compression) |
| Vertical gap of the rod 46 and ball 5: | 15 | mms. |
| Offset of the rod 46 from the ball axis: | 9 | mms. |

For other magnitudes of earthquakes, these parameters must be modified adequately experimentally.

It should be noted that the above embodiments are given only for the illustrative purposes and various modifications and changes may be made without departing from the scope and spirit of this invention as defined in the appended claims. For example, the disc member 7 may be omitted, that is, the diameter of the disc member 7 may be made equal to the diameter of the vertical rod 8 by appropriately selecting the other parameters. The suspension weight 44 may be suspended by a tension spring instead of the compression spring and, moreover, by a leaf spring such as cantilever check type instead of the helical spring. The kicking mechanism may include a mechanism for converting the vertical motion of the weight 44 into horizontal motion to kick the ball 5 in the horizontal direction.

What is claimed is:

1. A device for sensing vibration and responding thereto to actuate a utilization device, comprising a spherical ball, a ball saucer having a spherical inner surface for sustaining said ball, the radius of curvature of said inner surface being sufficiently greater than the radius of said ball, a depression formed in the bottom of said inner surface, a reciprocable member substantially disposed in said depression and placed just under said ball in the normal stationary condition, means of urging said reciprocable member upwardly such that said reciprocable member can not move against the weight of said ball in the normal stationary condition but can move upwardly to protrude from the inner surface of said ball saucer when said ball leaves said reciprocable member, and means for coupling said reciprocable member to said utilization device for actuating said utilization device in response to the vertical motion of said reciprocable member, said device further comprising a suspension weight suspended vertically by a spring to allow a vertical vibration, a kicking mechanism coupled to said suspension weight for displacing said ball in response to the vertical vibration of said suspension weight.

2. The device according to claim 1, characterized in that said suspension weight is located over said ball and said kicking mechanism comprises a vertical rod extending downwardly from said suspension weight, the lower end of said rod being positioned just above said ball and a little offset from the vertical axis of said ball in the normal stationary condition, whereby the vertical movement of said suspension weight results in displacement of said ball by said lower end of the rod.

* * * * *